United States Patent
Hsiao et al.

(10) Patent No.: US 9,964,785 B2
(45) Date of Patent: May 8, 2018

(54) DISPLAY DEVICE

(71) Applicant: Young Lighting Technology Inc., Hsin-Chu (TW)

(72) Inventors: Chun-Chung Hsiao, Hsin-Chu (TW); Chun-Chi Hsu, Hsin-Chu (TW); Ming-Yu Wu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days. days.

(21) Appl. No.: 14/819,415

(22) Filed: Aug. 5, 2015

(65) Prior Publication Data
US 2016/0062173 A1    Mar. 3, 2016

(30) Foreign Application Priority Data
Aug. 28, 2014    (TW) .............................. 103129679 A

(51) Int. Cl.
*G02F 1/1333*    (2006.01)

(52) U.S. Cl.
CPC .................. *G02F 1/133308* (2013.01); *G02F 2001/133314* (2013.01); *G02F 2001/133317* (2013.01); *G02F 2202/28* (2013.01)

(58) Field of Classification Search
CPC ... G02F 1/133308; G02F 2001/133337; G02F 2202/28; G02F 2001/133314; G02F 2001/133317
See application file for complete search history.

(56) References Cited

U.S. PATENT DOCUMENTS 6,177,971 B1 *  1/2001  Jung ................. G02F 1/133308
                                                        349/58
2014/0029295 A1 *  1/2014  Hsiao ................... G02B 6/0011
                                                        362/606
(Continued)

FOREIGN PATENT DOCUMENTS

TW          545413          8/2003
TW       200923507          6/2009
(Continued)

OTHER PUBLICATIONS

"Office Action of Taiwan Counterpart Application", dated Sep. 10, 2015, p. 1-p. 6.

*Primary Examiner* — Michael Caley
*Assistant Examiner* — Mariam Qureshi
(74) *Attorney, Agent, or Firm* — JCIPRNET

(57) ABSTRACT

A display device including a frame, a glass light guide plate, an optical film set, a display panel, a reflector, a back plate and an electronic element is provided. The frame has a first connecting surface and a second connecting surface. The glass light guide plate has a first glass surface and a second glass surface opposite to the first glass surface. The first glass surface is connected to the first connecting surface. The optical film set is disposed on the first glass surface. The display panel is disposed on the optical film set. The reflector is disposed under the second glass surface. The back plate is connected to the second connecting surface. The back plate constructs an accommodating space with the frame and the glass light guide plate. The electronic element is connected to the back plate and located in the accommodating space.

11 Claims, 1 Drawing Sheet

(56) References Cited

U.S. PATENT DOCUMENTS

| | | | | |
|---|---|---|---|---|
| 2014/0092631 A1* | 4/2014 | Fujii | ............................ | G09F 9/30 |
| | | | | 362/611 |
| 2014/0133174 A1* | 5/2014 | Franklin | .............. | H05K 9/0067 |
| | | | | 362/606 |
| 2014/0168864 A1* | 6/2014 | Lin | .................... | G02F 1/133308 |
| | | | | 361/679.01 |
| 2015/0002757 A1* | 1/2015 | Baek | ................. | G02F 1/133308 |
| | | | | 349/12 |
| 2015/0042899 A1* | 2/2015 | Tomomasa | ......... | G02F 1/133308 |
| | | | | 348/790 |
| 2016/0018692 A1* | 1/2016 | Park | ................... | G02F 1/133615 |
| | | | | 349/58 |

FOREIGN PATENT DOCUMENTS

| | | |
|---|---|---|
| TW | 201217843 | 5/2012 |
| TW | 201403174 | 1/2014 |
| TW | 201405211 | 2/2014 |

\* cited by examiner

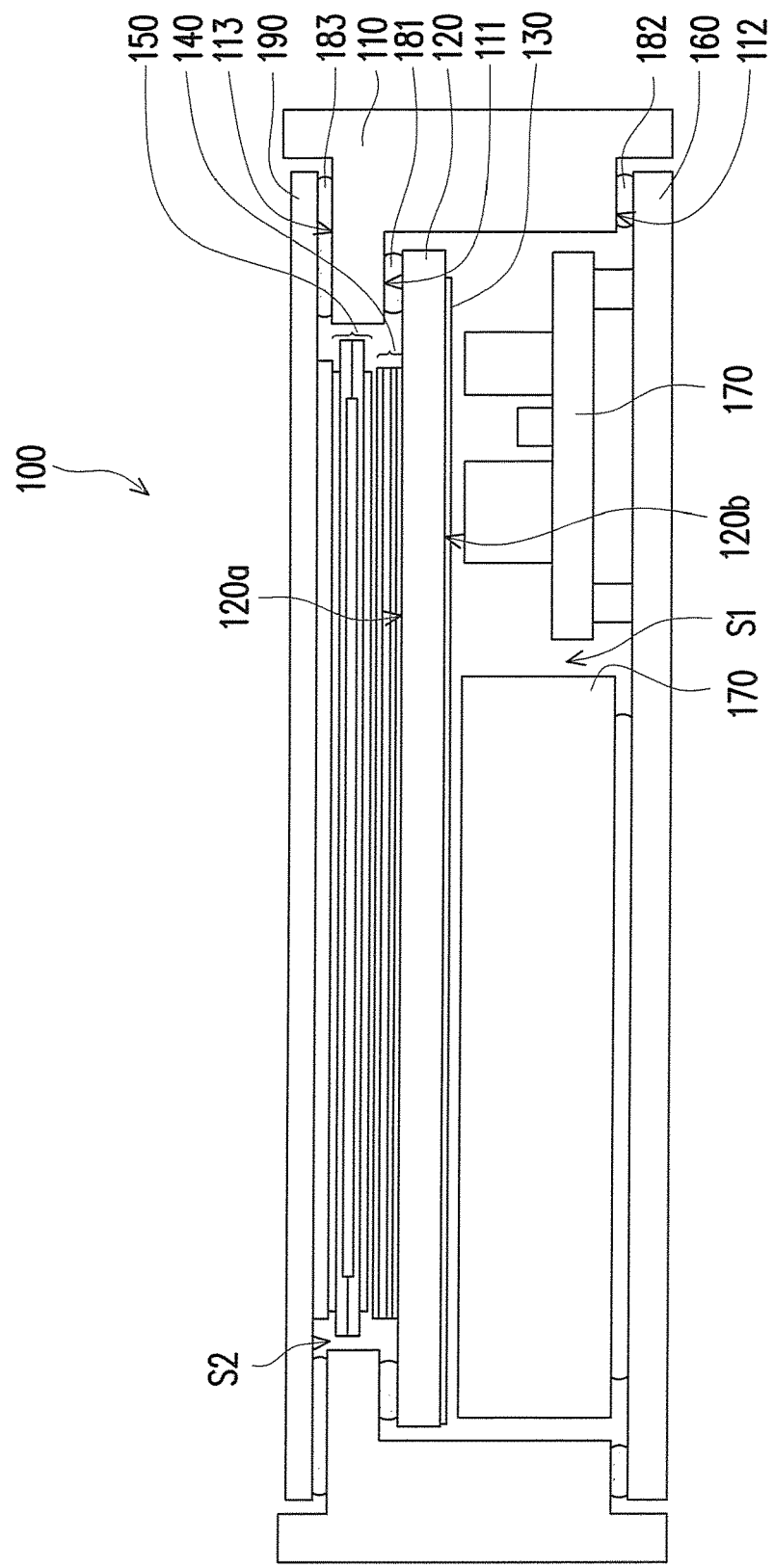

DISPLAY DEVICE

CROSS-REFERENCE TO RELATED APPLICATION

This application claims the priority benefit of Taiwan application serial no. 103129679, filed on Aug. 28, 2014. The entirety of the above-mentioned patent application is hereby incorporated by reference herein and made a part of this specification.

BACKGROUND OF THE INVENTION

Field of the Invention

The invention relates to an electronic device, and particularly relates to a display device.

Description of Related Art

Along with development of display technology, flat panel displays have become a mainstream of the displays. In various flat panel displays, a commonly used one is liquid crystal display (LCD). Due to advances of production technology and reduction of production cost, the LCDs are gradually promoted to various applications to serve as human-machine interfaces between electronic devices and users.

Automobile electronic devices such as satellite navigators and driving recorders also adopt the LCD to serve as an image output medium. However, besides requirements of lightweight and thinness, the automobile electronic devices are faced with a high temperature and high humidity usage environment. Therefore, it is very important for the automobile electronic devices to balance the above requirements.

Taiwan Patent Publication No. TW201405211 discloses a display device, in which a back surface of a light guide plate is adhered to a back plate through a plurality of double-sided adhesive. Taiwan Patent Publication No. TW201217843 discloses a touch device, in which periphery of each two opposite surfaces of a light guide plate thereof is adhered with a double-sided adhesive, such that the light guide plate can be respectively fixed to a touch panel and a touch casing. Taiwan Patent Publication No. TW200923507 discloses a planar light source device including a glass light guide plate.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention is directed to a display device having advantages of lightweight and thinness.

Other objects and advantages of the invention can be further illustrated by the technical features broadly embodied and described as follows.

In order to achieve one or a portion of or all of the objects or other objects, an embodiment of the invention provides a display device including a frame, a glass light guide plate, an optical film set, a display panel, a reflector, a back plate and an electronic element. The frame has a first connecting surface and a second connecting surface. The glass light guide plate has a first glass surface and a second glass surface opposite to the first glass surface. The first glass surface is connected to the first connecting surface. The optical film set is disposed on the first glass surface. The display panel is disposed on the optical film set. The reflector is disposed under the second glass surface. The back plate is connected to the second connecting surface. The back plate, the frame and the glass light guide plate construct an accommodating space. The electronic element is connected to the back plate and located in the accommodating space.

In an embodiment of the invention, the display device further includes a first adhesive layer, wherein the first glass surface is adhered to the first connecting surface through the first adhesive layer.

In an embodiment of the invention, the display device further includes a second adhesive layer, wherein the back plate is adhered to the second connecting surface through the second adhesive layer.

In an embodiment of the invention, the display device further includes a front panel disposed on the display panel, wherein the frame has a third connecting surface, and the front panel is connected to the third connecting surface.

In an embodiment of the invention, the display device further includes a third adhesive layer, wherein the front panel is adhered to the third connecting surface through the third adhesive layer.

In an embodiment of the invention, the front panel is a touch panel or a transparent plate.

In an embodiment of the invention, the frame is a metal frame or a plastic frame.

In an embodiment of the invention, the display panel is a liquid crystal display panel.

In an embodiment of the invention, the back plate is a metal back plate or a plastic back plate.

In an embodiment of the invention, the electronic element is a battery or a motherboard.

According to the above descriptions, the embodiment of the invention has at least one of the following advantages or effects. In the embodiment of the invention, the glass light guide plate is adopted to replace a conventional plastic light guide plate. Compared to the plastic light guide plate, the glass light guide plate has a better supporting strength, such that the display device is easy to pass a back pressure test, and it is unnecessary to form an additional supporting structure on the frame, which avails thinning the display device. Moreover, compared to the plastic light guide plate, the glass light guide plate can tolerate a high temperature and has lower hygroscopicity, such that the display device is easy to pass a high temperature and high humidity test. In addition, in the invention, the optical film set and the display panel are directly disposed on the glass light guide plate, so that a metal frame used for wrapping a plastic light guide plate, an optical film set and a LCD panel of a conventional liquid crystal module (LCM) is omitted, and the display device can be further thinned.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic cross-sectional view of a display device according to an embodiment of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the FIGURE(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the teens "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIG. 1, in the embodiment, the display device 100 can be applied to an automobile electronic device, for example, a satellite navigator and a driving recorder, etc., though the invention is not limited thereto. The display device 100 includes a frame 110, a glass light guide plate 120, a reflector 130, an optical film set 140, a display panel 150, a back plate 160 and an electronic element 170. In the embodiment, two electronic elements 170 are exemplarily illustrated in FIG. 1, though the invention is not limited thereto.

The frame 110 (for example, a metal frame or a plastic frame) has a first connecting surface 111 and a second connecting surface 112. The glass light guide plate 120 has a first glass surface 120a and a second glass surface 120b opposite to the first glass surface 120a. The first glass surface 120a is connected to the first connecting surface 111. The optical film set 140 is disposed on the first glass surface 120a. The optical film set 140 may include a plurality of optical films, for example, diffusion films, brightness enhancement films and prism films, etc. The display panel 150 (for example, a liquid crystal display (LCD) panel) is disposed on the optical film set 140, wherein the optical film set 140 is located between the display panel 150 and the first glass surface 120a of the glass light guide plate 120, and the glass light guide plate 120 carries the optical film set 140 and the display panel 150. The reflector 130 is disposed under the second glass surface 120b, and the second glass surface 120b is located between the first glass surface 120a and the reflector 130. A light source (not shown) of the display device 100 is, for example, disposed at a side of the glass light guide plate 120, and a light beam emitted by the light source is transmitted by the glass light guide plate 120 and provided to the display panel 150 through the first glass surface 120a, so as to assist the display panel 150 to display image. The back plate 160 (for example, a metal back plate or a plastic back plate) is connected to the second connecting surface 112. The back plate 160, the frame 110 and the glass light guide plate 120 construct an accommodating space S1. The electronic element 170 (for example, a battery or a motherboard) is connected to the back plate 160 and located in the accommodating space S1. Further, in the embodiment, the electronic element 170 is located between the reflector 130 under the second glass surface 120b of the glass light guide plate 120 and the back plate 160.

Further, in the embodiment, the glass light guide plate 120 has better supporting strength, and the optical film set 140 and the display panel 150 can be directly disposed on the glass light guide plate 120, i.e. the glass light guide plate 120 can carry the optical film set 140 and the display panel 150, so that the glass light guide plate 120 has a light guiding function and an element supporting function simultaneously. In the embodiment, a metal frame used for wrapping a plastic light guide plate, an optical film set and a LCD panel in a conventional liquid crystal module (LCM) can be omitted, such that the display device 100 can be further thinned. Moreover, compared to the conventional plastic light guide plate, the glass light guide plate 120 has better supporting strength, such that the display device 100 is easy to pass a back pressure test, and it is unnecessary to form an additional supporting structure on the frame 110, which avails thinning the display device 100. Moreover, the glass light guide plate 120 can tolerate a high temperature and has lower hygroscopicity, such that the display device 100 is easy to pass a high temperature and high humidity test.

In the embodiment, the display device 100 further includes a first adhesive layer 181 and a second adhesive layer 182. The first glass surface 120a is adhered to the first connecting surface 111 through the first adhesive layer 181. The back plate 160 is adhered to the second connecting surface 112 through the second adhesive layer 182. Moreover, the display device 100 further includes a front panel 190 (for example, a touch panel or a transparent plate). The front panel 190 is disposed on the display panel 150. The frame 110 has a third connecting surface 113, and the front panel 190 is connected to the third connecting surface 113. Similarly, the display device 100 further includes a third adhesive layer 183. The front panel 190 is adhered to the third connecting surface 113 through the third adhesive layer 183. Further, in the embodiment, the front panel 190, the frame 110, the glass light guide plate 120 construct another accommodating space S2. The display panel 150 and the optical film set 140 are located in the accommodating space S2.

The embodiment of the invention has at least one of the following advantages or effects. In the embodiment of the invention, the glass light guide plate is adopted to replace a conventional plastic light guide plate. Compared to the plastic light guide plate, the glass light guide plate has a better supporting strength, such that the display device is easy to pass a back pressure test, and it is unnecessary to form an additional supporting structure on the frame, which avails thinning the display device. Moreover, compared to the plastic light guide plate, the glass light guide plate can tolerate a high temperature and has lower hygroscopicity, such that the display device is easy to pass a high temperature and high humidity test. In addition, in the invention, the optical film set and the display panel are directly disposed on the glass light guide plate, so that the glass light guide plate has a light guiding function and an element supporting function simultaneously, and a metal frame used for wrapping a plastic light guide plate, an optical film set and a LCD panel of a conventional liquid crystal module (LCM) is omitted, and the display device can be further thinned.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
   a frame having a first connecting surface and a second connecting surface;
   a glass light guide plate having a first glass surface and a second glass surface opposite to the first glass surface, wherein the first glass surface is connected to the first connecting surface, and the first glass surface is parallel with the first connecting surface;
   an optical film set disposed on the first glass surface;
   a display panel disposed on the optical film set, wherein a width of the display panel along a direction parallel to the first glass surface is smaller than a width of the glass light guide plate along the direction;
   a reflector disposed under the second glass surface;
   a back plate connected to the second connecting surface, wherein the back plate, the frame and the glass light guide plate construct an accommodating space;
   an electronic element connected to the back plate and located in the accommodating space; and
   a first adhesive layer, wherein the first glass surface is adhered to the first connecting surface through the first adhesive layer, and the first adhesive layer is located between the first connecting surface and the first glass surface.

2. The display device as claimed in claim 1, further comprising:
   a second adhesive layer, wherein the back plate is adhered to the second connecting surface through the second adhesive layer.

3. The display device as claimed in claim 1, further comprising:
   a front panel disposed on the display panel, wherein the frame has a third connecting surface, and the front panel is connected to the third connecting surface.

4. The display device as claimed in claim 3, further comprising:
   a third adhesive layer, wherein the front panel is adhered to the third connecting surface through the third adhesive layer.

5. The display device as claimed in claim 3, wherein the front panel is a touch panel or a transparent plate.

6. The display device as claimed in claim 1, wherein the frame is a metal frame or a plastic frame.

7. The display device as claimed in claim 1, wherein the display panel is a liquid crystal display panel.

8. The display device as claimed in claim 1, wherein the back plate is a metal back plate or a plastic back plate.

9. The display device as claimed in claim 1, wherein the electronic element is a battery or a motherboard.

10. The display device as claimed in claim 9, wherein the electronic element is located between the reflector under the second glass surface of the glass light guide plate and the back plate.

11. A display device, comprising:
    a frame having a first connecting surface and a second connecting surface;
    a glass light guide plate having a first glass surface and a second glass surface opposite to the first glass surface, wherein the first glass surface is connected to the first connecting surface;
    an optical film set disposed on the first glass surface;
    a display panel disposed on the optical film set, wherein a width of the display panel along a direction parallel to the first glass surface is smaller than a width of the glass light guide plate along the direction;
    a reflector disposed under the second glass surface;
    a back plate connected to the second connecting surface, wherein the back plate, the frame and the glass light guide plate construct an accommodating space; and
    an electronic element directly connected to the back plate and located in the accommodating space, wherein the electronic element is located between the reflector under the second glass surface of the glass light guide plate and the back plate.

* * * * *